United States Patent
Shinozaki et al.

(10) Patent No.: US 7,084,853 B2
(45) Date of Patent: Aug. 1, 2006

(54) DISPLAY UNIT AND DRIVE METHOD THEREFOR

(75) Inventors: Kenji Shinozaki, Tokyo (JP); Takeshi Matsui, Tokyo (JP); Kenichi Takahashi, Kanagawa (JP)

(73) Assignee: Sony Corporation, Tokyo (JP)

(*) Notice: Subject to any disclaimer, the term of this patent is extended or adjusted under 35 U.S.C. 154(b) by 459 days.

(21) Appl. No.: 10/250,965

(22) PCT Filed: Nov. 7, 2002

(86) PCT No.: PCT/JP02/11595

§ 371 (c)(1),
(2), (4) Date: Jul. 10, 2003

(87) PCT Pub. No.: WO03/042755

PCT Pub. Date: May 22, 2003

(65) Prior Publication Data
US 2004/0070724 A1 Apr. 15, 2004

(30) Foreign Application Priority Data
Nov. 12, 2001 (JP) ............... 2001-346260

(51) Int. Cl.
*G09G 3/38* (2006.01)
*G09G 3/20* (2006.01)
(52) U.S. Cl. ...................... 345/105; 359/265
(58) Field of Classification Search ........ 359/265–275; 345/105
See application file for complete search history.

(56) References Cited

U.S. PATENT DOCUMENTS 4,181,406 A * 1/1980 Kohara et al. ............... 359/269
6,301,039 B1 * 10/2001 Tench ......................... 359/267

FOREIGN PATENT DOCUMENTS

JP       11-101994       4/1999
JP      2000-347225    12/2000

* cited by examiner

*Primary Examiner*—Dennis-Doon Chow
(74) *Attorney, Agent, or Firm*—Frommer Lawrence & Haug LLP; William S. Frommer; Thomas F. Presson

(57) ABSTRACT

An electrochemical display apparatus in which simple matrix driving is realized, whereby apparatus constitution can be simplified, and the price of the apparatus can be lowered. The electrochemical display apparatus performs display by use of electrochemical deposition/dissolution of a metal. The display apparatus is driven by a simple matrix driving system, in which a deposition overvoltage at the time of deposition of metallic ions as the metal is used as a threshold in the simple matrix driving. A driving voltage is set to be not more than two times the deposition overvoltage. The electrochemical display apparatus includes transparent electrodes and counter electrodes, the display is performed by utilizing deposition/dissolution of the metal on the transparent electrodes, and the potential difference between the metal to be deposited on the transparent electrodes and the counter electrodes is set to be less than the deposition overvoltage. Ideally, the same metal as the metal which is deposited is used for constituting the counter electrodes.

22 Claims, 4 Drawing Sheets

DISPLAY UNIT AND DRIVE METHOD THEREFOR

TECHNICAL FIELD

The present invention relates to a display apparatus for performing a display through deposition/dissolution of a metal, and to a display apparatus suitable for the so-called electronic paper. Further, the present invention relates to a method of driving the display apparatus.

BACKGROUND ART

In recent years, attendant on the spread of networks, documents hitherto distributed in the form of printed matter have come to be transmitted in the form of the so-called electronic documents. Furthermore, in an increasing number of cases, books and magazines have also come to be provided in the form of the so-called electronic publishing. A conventional method for reading these forms of information is to read the information from a computer's CRT (cathode ray tube) or a liquid crystal display.

However, it has been pointed out that in the case of the light-emitting type displays such as CRT, wearing is severe due to a human technological cause so that the system is not suited to long-time reading or the like. In addition, even in the case of light-receiving type displays such as liquid crystal displays, flickering intrinsic of the fluorescent tube is so severe that this system is also not suited to reading. Furthermore, both types of systems have the difficulty that the reading site is limited to the places where a computer is installed.

In recent years, reflective-type liquid crystal displays not using a backlight have been put to practical use. However, the reflectance at the time of non-display (display of white color) in the liquid crystal is 30 to 40%, conspicuously low in visibility as compared with the reflectances of printed matters on paper (the reflectance of OA paper and bunko-size books (Japanese pocket-books) is 75%, and the reflectance of newsprint paper is 52%). In addition, the reflective-type liquid crystal display causes wearing due to glaring of the reflective plate, which is also not suited to long-time reading.

In order to solve these problems, systems so-called paper-like display or electronic paper have been being developed. In these systems, colored particles are moved between electrodes by cataphoresis, or dichroic particles are rotated by an electric field, to achieve coloration. However, these methods have the difficulties that the gaps between the particles absorbs light with the result of bad contrast and that a practical writing speed (within 1 sec) cannot be obtained unless the driving voltage is set to or above 100 V.

As contrasted to the displays based on these display systems, an electrochemical display apparatus (electrochromic display: ECD) based on an electrochemical action is superior in view of higher contrast, and has been put to practical use in, for example, photochromic glass and watch displays. However, the photochromic glass and watch-displays intrinsically do not need matrix driving, so that the electrochemical display apparatus is not directly suited to such display uses as electronic paper. Besides, the electrochemical display apparatus is generally poor in black quality, and the reflectance thereof is on a low level.

In addition, such a display as the electronic paper is, in its use, continuedly exposed to solar light or room light, and, in the electrochemical display apparatus put to practical use in the photochromic glass and watch displays, an organic material is used for forming black portions, which gives rise to a problem as to light resistance. Generally, organic materials are poor in light resistance, and when used for a long time, they show discoloring with the result of a lowering in black concentration.

As a system for solving these technical problems, there has been proposed an electrochemical display apparatus which uses metallic ions as a material for performing a color change. In this electrochemical display apparatus, metallic ions are preliminarily mixed into a polymeric solid state electrolyte layer, and a metal is deposited/dissolved by electrochemical oxidation/reduction, and a color change attendant on this is utilized for display. Here, for example, when a coloring material is preliminarily contained in the polymeric solid state electrolyte layer, the contrast upon the color change can be enhanced.

Figure 8:
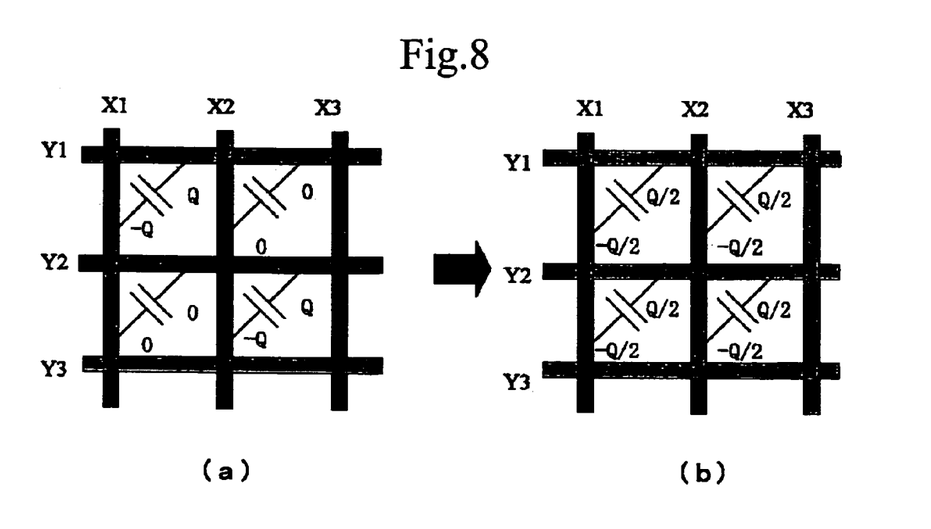
FIG. 8 illustrates leveling of electric charges in simple matrix driving, in which (a) of FIG. 8 is a schematic diagram showing the condition before movement of the electric charges, and (b) of FIG. 8 is a schematic diagram showing the condition after the movement of the electric charges.

Meanwhile, for application of the electrochemical display apparatus to such display uses as electronic paper, matrix driving is required. However, in the case of the display utilizing an electrochemical reaction, adoption of a simple matrix driving system gives rise to the problem of unintended coloring due to movement of electric charges. For example, in the simple matrix driving, when (X1, Y1) and (X2, Y2) are selected as shown in (a) of FIG. 8, leveling of electric charges occurs, whereby electric charges move also to (X1, Y2) and (X2, Y1) as shown in (b) of FIG. 8, with the result of coloring there. Particularly, in an electrochemical display apparatus using tungsten oxide or a viologen compound according to the prior art, electric charges are accumulated on an electrode under a colored condition, to generate a potential difference between both electrodes, so that when one pixel is selected and thereafter another pixel is selected, movement of the electric charge occurs, whereby an unintended pixel is colored.

Accordingly, hitherto, it has been considered that the driving system for the electrochemical display apparatus must be an active matrix driving, and the simple matrix driving has not been investigated in practice. However, where the active matrix driving system is adopted, there are the inconvenience that the apparatus would be complicated in constitution and would be extremely high in price.

The present invention has been proposed in consideration of the above circumstances. Accordingly, it is an object of the present invention to enable the simple matrix driving in a display apparatus utilizing an electrochemical reaction, and thereby to provide a display apparatus, and a method of driving the same, in which apparatus constitution can be simplified and the price of the apparatus can be lowered.

DISCLOSURE OF INVENTION

In general, in reduction (electrodeposition) and oxidation (dissolution) reactions of metallic ions on an electrode, when it is assumed that the reactions proceed ideally, the reduction (electrodeposition) reaction occurs when the electrode is set to a potential slightly lower than the equilibrium oxidation-reduction potential of the metallic ions, whereas the oxidation (dissolution) reaction occurs when the electrode is set to a potential slightly higher than the equilibrium oxidation-reduction potential. In the actual system, however, when the electrode is, for example, set to a potential slightly lower than the equilibrium oxidation-reduction potential, the reduction reaction does not occurs and, therefore, no current flows. The difference between the voltage at which the reduction reaction actually begins and the equilibrium oxidation-reduction potential is called overvoltage, which is generally not more than 500 mV in the case of metallic ions.

Paying attention to this fact, the present inventors have found out that a simple matrix driving can be achieved by providing a voltage-current characteristic with a threshold through utilizing the overvoltage at the time of reduction.

The present invention has been completed based on the finding. Namely, according to one aspect of the present invention, there is provided a display apparatus for performing a display by use of electrochemical deposition/dissolution of a metal, wherein the apparatus is driven by a simple matrix driving system, and a deposition overvoltage at the time of deposition of metallic ions as the metal is used as a threshold in the simple matrix driving. According to another aspect of the present invention, there is provided a method of driving a display apparatus for performing a display by use of electrochemical deposition/dissolution of a metal by a simple matrix driving system, wherein the simple matrix driving is conducted by using a deposition overvoltage at the time of deposition of metallic ions as the metal as a threshold.

Where the voltage-current characteristic is provided with a threshold by utilizing the deposition overvoltage, the simple matrix driving can be performed, without causing unintended pixel coloration. Namely, with the voltage-current characteristic provided with the threshold, even when, for example, the movement of electric charges due to the leveling as above-mentioned has occurred, if the resulting potential does not exceed the threshold, deposition of the metal would not occur and coloration would not be generated. Here, when the system is preliminarily so set that in the condition where the metal is deposited on an electrode on one side constituting the simple matrix the potential difference between the electrode on one side and an electrode (counter electrode) on the other side does not exceed the threshold, then the movement of electric charges due to the potential difference after coloration is prevented, and the coloration at other pixels is obviated.

BEST MODE FOR CARRYING OUT THE INVENTION

Now, a display apparatus and a method of driving the same obtained by application of the present invention will be described in detail below, referring the drawings.

Figure 1:
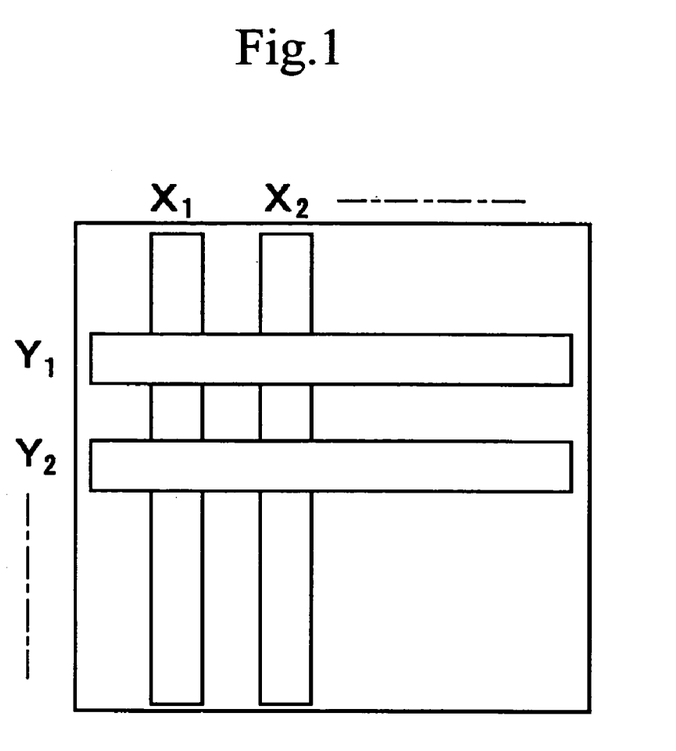
FIG. 1 is a schematic diagram showing the arrangement condition of electrodes for simple matrix driving.
Figure 2:
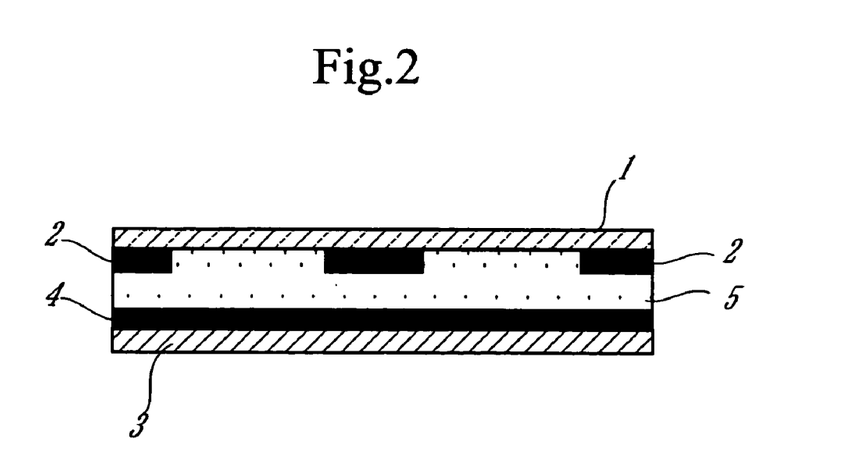
FIG. 2 is a general sectional view showing one example of constitution of an electrochemical display apparatus according to the present invention.

An electrochemical display device according to the present invention is driven by a simple matrix driving system, and the electrode structure thereof comprises a first group of electrodes X1, X2 . . . and a second group of electrodes Y1, Y2 . . . arranged orthogonally to each other as shown in FIG. 1. FIG. 2 shows a specific structure of the electrode structure, in which stripe form transparent conductive films 2 corresponding to the first group of electrodes are formed on a transparent substrate 1. Facing to this, a support substrate 3 provided thereon with stripe form counter electrodes 4 corresponding to the second group of electrodes is disposed, and these are laminated on each other with a polymeric solid state electrolyte layer 5 therebetween. Predetermined numbers of the transparent conductive films 2 and the counter electrodes 4 according to the number of pixels are provided, and points of intersection of these constitute the pixels.

In the above constitution, as the transparent substrate 1, transparent glass substrates such as a quartz glass plate and a white glass plate can be used. The materials which can be used to constitute the transparent substrate 1 are not limited to the transparent glass substrate, and examples of the materials include esters such as polyethylene naphthalate, polyethylene terephthalate, etc., polyamides, polycarbonates, cellulose esters such as cellulose acetate, etc., fluoro polymers such as polyvinylidene fluoride, tetrafluoroethylene-hexafluoropropylene copolymers, etc., polyethers such as polyoxymethylene, etc., polyacetal, polystyrene, polyolefins such as polyethylene, polypropylene, methylpentene polymer, etc., and polyimides such as polyimide-amides, polyether imides, etc. Where one of these synthetic resins is used as the support, it is possible to obtain a rigid substrate which cannot be bent easily, and it is also possible to obtain a flexible film form structural body.

Materials which are preferably used to constitute the transparent conductive films 2 include, for example, mixtures of $In_2O_3$ and $SnO_2$, the so-called ITO film, and films coated with $SnO_2$ or $In_2O_3$. Films obtained by doping the ITO film or the $SnO_2$- or $In_2O_3$-coated films with Sn or Sb may also be used, and MgO, ZnO and the like may also be used.

On the other hand, matrix (base material) polymers to be used for constituting the polymeric solid state electrolyte layer 5 include polyethylene oxide, polyethyleneimine, and polyethylene sulfide whose skeleton units are represented by —(C—C—O)n-, —(C—C—N)n-, and —(C—C—S)n-, respectively. Polymers having these backbone chain structures and further having branched chains may also be used as the matrix polymer. In addition, polymethyl methacrylate, polyvinylidene fluoride, polyvinylidene chloride, polycarbonates, and the like are also preferable for use as the matrix polymer.

In forming the polymeric solid state electrolyte layer 5, it is preferable to add a desired plasticizer to the matrix polymer. In the case where the matrix polymer is hydrophilic, preferable plasticizers include water, ethyl alcohol, isopropyl alcohol, mixtures of these, etc. In the case where the matrix polymer is hydrophobic, preferable plasticizers include propylene carbonate, dimethyl carbonate, ethylene carbonate, Y-butyrolactone, acetonitrile, sulfolane, dimethoxyethane, ethyl alcohol, isopropyl alcohol, dimethylformamide, dimethyl sulfoxide, dimethylacetamide, n-methylpyrrolidone, mixtures of these, etc.

The polymeric solid state electrolyte layer 5 is formed by dissolving an electrolyte in the matrix polymer. Examples of the electrolyte include not only metallic salts capable of functioning as a color forming material for display but also quaternary ammonium halides (F, Cl, Br, I), alkali metal halides (LiCl, LiBr, LiI, NaCl, NaBr, NaI, etc.), alkali metal salt cyanides, alkali metal salt thiocyanides, etc., and a material containing at least one support electrolyte selected from these is dissolved as the electrolyte. Examples of the metallic ion for constituting the metallic salt capable of functioning as a color forming material for display include bismuth, copper, silver, lithium, iron, chromium, nickel, cadmium, etc., which may be used either singly or in combination. As the metallic salts, arbitrary salts of these metals may be used; for example, the silver salts which can be used include silver nitrate, silver borofluoride, silver halides, silver perchlorate, silver cyanide, silver thiocyanide, etc.

Besides, it is preferable to add a growth inhibitor at the time of deposition of the metal, to the polymeric solid state electrolyte layer 5. Preferable growth inhibitors include substances which comprise a group having at least an oxygen atom, a sulfur atom or a nitrogen atom. Cumarin, triethanolamine and the like are preferable for use as the growth inhibitor.

In order to enhance contrast, a colorant may be added to the polymeric solid state electrolyte layer 5. Where the coloration upon the deposition of the metal is black, it is preferable to set the background color to be white, and a white material with a high hiding property is preferably introduced as the coloring material. As such a material, white particles for coloration can be used. Examples of the material which can be used as the white particles for coloration include titanium dioxide, calcium carbonate, silica, magnesium oxide, aluminum oxide, etc.

Here, the ratio in which the white pigment is mixed, in the case of inorganic particles, is preferably from 1 to 20% by weight, more preferably from about 1 to 10% by weight, and further preferably from about 5 to 10% by weight. The reason for limiting the ratio to within such a range is as follows. The white pigment such as titanium oxide is not dissolved in the polymer but is simply dispersed in the polymer, and when the mixing ratio of the white pigment is increased, the white pigment agglomerates, resulting in a non-uniform optical density.

In addition, since the white pigment does not have ionic conductivity, an increase in the mixing ratio thereof leads to a lowering in the conductivity of the polymeric solid state electrolyte. In consideration of both the above factors, the upper limit of the mixing ratio is about 20% by weight.

Where the inorganic particles are mixed as the coloring material into the polymeric solid state electrolyte layer 5 as above-mentioned, the thickness of the polymeric solid stage electrolyte layer 5 is preferably from 10 to 200 μm, more preferably from 10 to 100 μm, and further preferably from 10 to 50 μm. As the polymeric solid state electrolyte layer 5 is thinner, the resistance between electrodes is lower, so that the coloration and decoloration times are shorter, and power consumption is smaller. Therefore, a thinner polymeric solid state electrolyte layer is more preferable. However, when the thickness of the polymeric solid state electrolyte layer 5 is reduced to below 10 μm, the mechanical strength thereof is lowered, resulting in such inconveniences as generation of pinholes or cracks. In addition, where the thickness of the polymeric solid state electrolyte layer 5 is too small, the mixing amount of the inorganic pigment is reduced, which may lead to an insufficient whiteness (optical density).

Incidentally, where a dye is used as the coloring material to be mixed into the polymeric solid state electrolyte layer 5, the mixing ratio of the coloring material may be not more than 10% by weight. This is because the color forming efficiency of coloring matters is by far higher than that of the inorganic particles. Therefore, in the case of an electrochemically stable coloring matter, even a small amount thereof can provide a sufficient contrast. As such a coloring matter, for example, oil-soluble dyes are preferable.

The support substrate 3 provided on the back side may not necessarily be transparent, and a substrate, a film or the like which can securely hold the counter electrodes 4 can be used as the support substrate 3. Examples of the materials for use as the support substrate 3 include glass substrate such as a quartz glass plate, a white glass plate, etc., ceramic substrates, paper substrates, wood substrates, etc. Naturally, the usable materials are not limited to these, and synthetic resin substrates and the like can also be used. Examples of the material of such a synthetic resin substrate include esters such as polyethylene naphthalate, polyethylene terephthalate, etc., cellulose esters such as polyamides, polycarbonates, cellulose acetate, etc., fluoro polymers such as polyvinylidene fluoride polytetrafluoroethylene-co-hexafluoropropylene, etc., polyethers such as polyoxymethylene, etc., polyolefins such as polyacetals, polystyrene, polyethylene, polypropylene, methylpentene polymer, etc., and polyimides such as polyimide-amides, polyether imides, etc. Where such a synthetic resin is used to constitute the support substrate, it is possible to obtain a rigid substrate which cannot be bent easily, and it is also possible to obtain a flexible film form structural body.

As the counter electrodes 4, there can be used a conductive material, for example, a metallic material. It should be noted here that where the potential difference between the metal constituting the counter electrodes 4 and the metal to be deposited on the transparent conductive films 2 is large, electric charges may be accumulated on the conductive films in a colored condition, and movement of the electric charges may occur, resulting in coloration at unintended pixels. Particularly, where the potential difference exceeds the deposition overvoltage at the time of deposition of the metal (the threshold in the simple matrix driving), the just-mentioned coloration may occur. In view of this, such a metal that the potential difference between itself and the metal to be deposited as the color forming material is less than the deposition overvoltage (threshold) is desirably selected for constituting the counter electrodes 4. Ideally, as the metallic material for constituting the counter electrodes 4, the metal in the pre-ionized state (metallic state) of the metal ion used as the color forming material is used. Namely, the same metal as the metal to be subjected to deposition/dissolution is used for constituting the counter electrodes 4; for example, where deposition/dissolution of silver is utilized, silver is used to constitute the counter electrodes 4. By this, it is possible to obviate the problem that the above-mentioned potential difference would be generated in the condition where the metal is deposited on the transparent conductive films 2.

Figure 3:
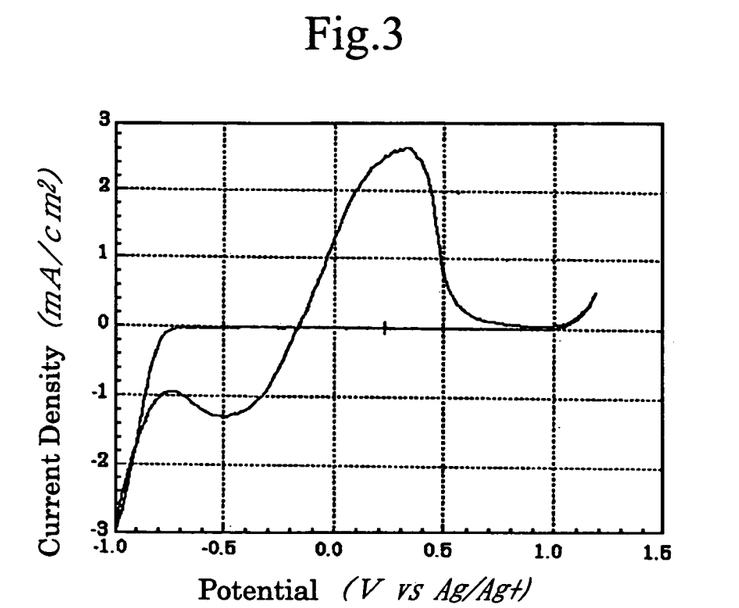
FIG. 3 is a cyclic Voltamogram showing the deposition overvoltage of silver.

In the electrochemical display apparatus constituted as described above, display is conducted by the simple matrix driving. At the time of driving, the deposition overvoltage of the metal is utilized as a threshold voltage, and a voltage not less than the threshold is impressed between the transparent conductive film 2 and the counter electrode 4, at the pixels where the metal is to be deposited. FIG. 3 is a cyclic Voltamogram showing the deposition overvoltage in the case of silver. The voltage at the rise of the reduction current in the cyclic Voltamogram gives the deposition overvoltage, and the simple matrix driving is conducted with the value of the overvoltage as the threshold. By this, it is ensured that even when electric charges are moved to other pixels than the intended pixels, the deposition of the metal and the attendant coloration would not occur at the other pixels unless the threshold is exceeded.

It should be noted here that the driving voltage is not more than two times the deposition overvoltage. For example, in the case of dot sequential scanning, the voltage impressed on a half-selected dot is ½ of the driving voltage impressed on a selected dot where the number of lines, N, of the matrix electrodes is sufficiently large. In the case of the dot sequential scanning, the voltage impressed on the half-selected dot in an N×N matrix is given by $(N-1)V/(2N-1)$, where V is the voltage impressed on the selected dot, according to the description in "Ekisho Erekutoronikusu No Kiso To Oyo (Fundamentals and Applications of Liquid Crystal Electronics)" (Ohmsha Co., Ltd.; p. 94). Where N is sufficiently large, the voltage impressed on the half-selected dot is V/2. Therefore, crosstalk would not occur unless ½ of the driving voltage exceeds the deposition overvoltage.

Figure 4:
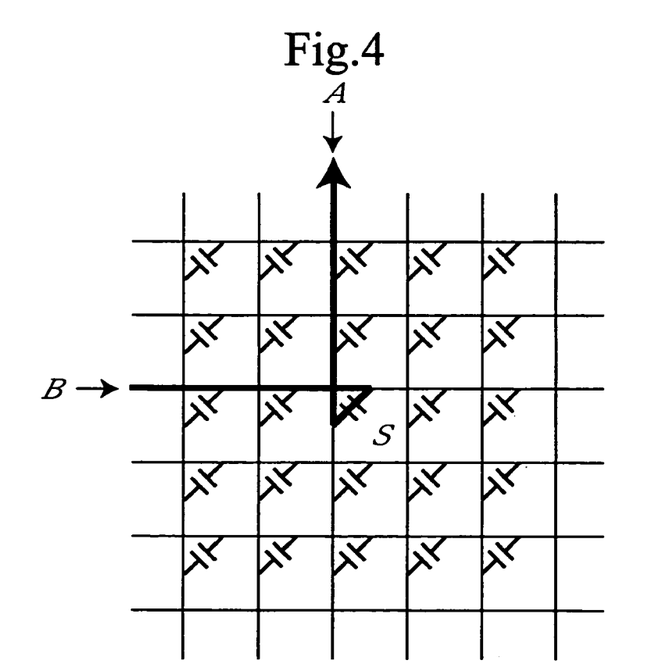
FIG. 4 is a schematic diagram showing a primary path of current at a selected dot.
Figure 5:
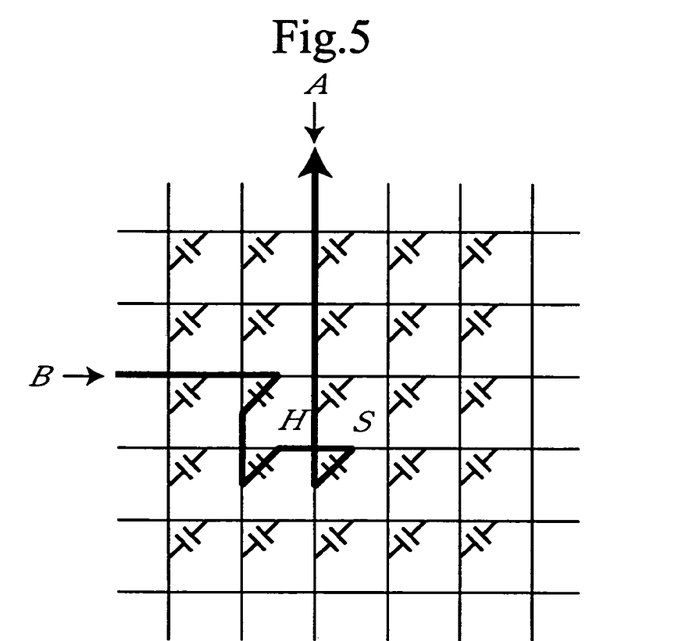
FIG. 5 is a schematic diagram showing one example of secondary path of current at a half-selected dot.
Figure 6:
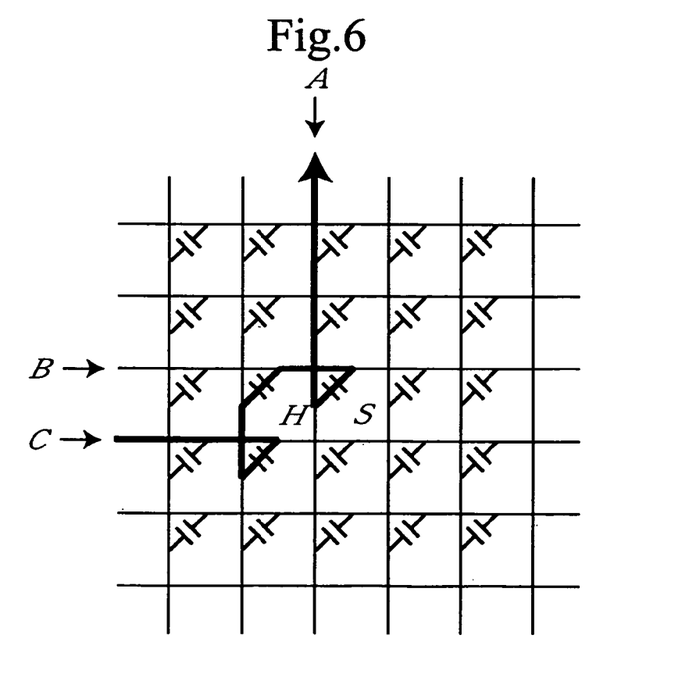
FIG. 6 is a schematic diagram showing another example of secondary path of current at a half-selected dot.

In the simple matrix driving, line sequential scanning is generally conducted. In this case, the voltage impressed on the half-selected dots differs according to the pattern being displayed. However, since the electrochemical display apparatus is different from a liquid crystal display in that it has polarity, the influences of a plurality of selected dots on a half-selected dot will in many cases cancel each other. For example, FIG. 4 shows an original path (primary path) in the case where scanning lines A and B indicated by arrows are selected. A driving current indicated by bold line in the figure flows through the selected dot S. On the other hand, a current indicated by bold line in FIG. 5 flows through the adjacent selected dot (half-selected dot) H, due to a secondary path shown in the figure. As contrasted to this, another scanning line C is selected as shown in FIG. 6, a current due to another secondary path indicated by bold line in the figure flows, and the current flowing through the half-selected dot H is in the direction opposite to that due to the secondary path shown in FIG. 5. Thus, where a multiplicity of dots are selected, the influences of the selected dots on a half-selected dot cancel each other as above-mentioned. Therefore, even in the case of a line sequential operation, in practice, crosstalk will not occur if the above-mentioned condition (the driving voltage is set to be not more than two times the deposition overvoltage) is satisfied.

Figure 7:
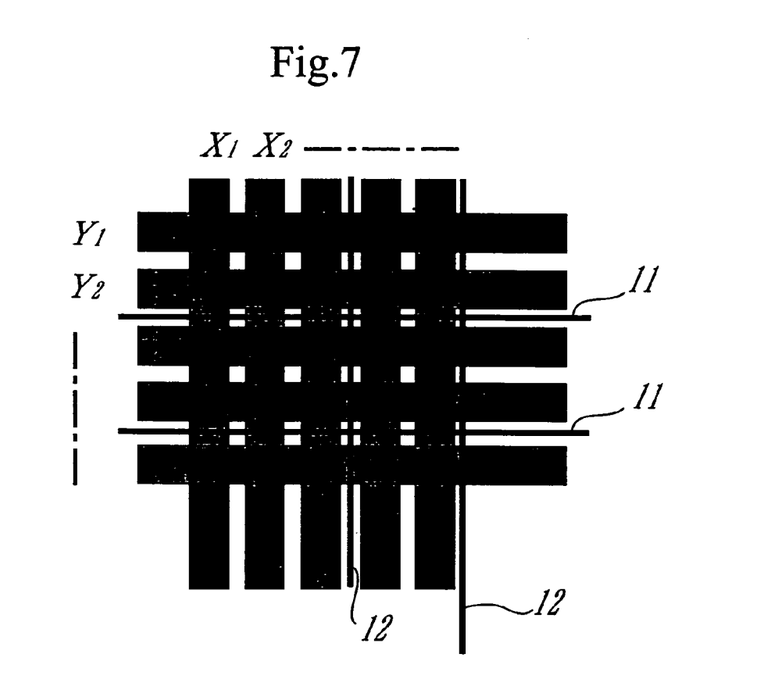
FIG. 7 is a schematic diagram showing a formed condition of third electrodes.

While the basic constitution of the display apparatus and the method of driving the same which are obtained by application of the present invention have been described above, the present invention is not limited to the above description, and various constitutions can be adopted. For example, as shown in FIG. 7, potential detecting electrodes 11 and 12 independent from the first group of electrodes X1, X2 . . . (transparent conductive films 2) and the second group of electrodes Y1, Y2 . . . (counter electrodes 4) may be provided as third electrodes. These potential detecting electrodes 11 and 12 are provided as electrically insulated members in the same plane as the transparent pixel electrodes (transparent conductive films 2) or the common electrodes (counter electrodes 4) on the transparent substrate 1, and are used for detecting the potentials of the transparent pixel electrodes and the common electrodes on the transparent substrate 1.

The potential detecting electrodes 11 and 12 which are the third electrodes can be formed on the same surface as the first group of electrodes X1, X2 . . . (transparent conductive films 2) or the second group of electrodes Y1, Y2 . . . (counter electrodes 4) which are stripe electrodes. Here, in order to accurately detect the potential in the process of the reaction, it is preferable for the potential detecting electrodes 11 and 12 to be provided on the side of the first group of electrodes X1, X2 . . . (transparent conductive films 2), but this arrangement lowers the numerical aperture disadvantageously.

The electrode material for constituting the potential detecting electrodes 11 and 12 which are the third electrodes is preferably silver. One or a plurality of the potential detecting electrodes are provided between the stripe electrodes in parallel to the stripe electrodes, further, one or a plurality of the potential detecting electrodes are provided orthogonally to the stripe electrodes, and the potential detecting electrodes are connected at the points of intersection. In this instance, in the areas where the third electrodes orthogonal to the stripe electrodes are disposed astride the stripe electrodes, the surfaces of the stripe electrodes must be coated with an insulating film.

Now, specific examples of application of the present invention will be described below, based on experimental results.

EXAMPLE 1

Metallic ion: bismuth

[Formation of Stripe Form Electrodes]

First Electrodes (Display Poles)

Stripe form transparent electrodes and an insulating film were formed on a polycarbonate substrate measuring 10 cm×10 cm and having a thickness of 0.2 mm, by the following procedure. The stripe width was 150 µm, with a pitch of 170 µm, and the size of opening portions (portions not covered with the insulating film) was 140 µm square. An ITO film having a thickness of 500 nm and a sheet resistance of 12 Ω/□ was formed on the polycarbonate substrate by sputtering.

Next, a photoresist was applied to the ITO film, and the photoresist was formed into a desired stripe shape by lithography. Subsequently, the polycarbonate substrate was immersed in an ITO etching liquid, whereby the ITO film in the areas not covered with the photoresist was removed. Thereafter, the photoresist was removed by an organic solvent such as acetone. Further, a 200 nm thick film of $SiO_2$ was formed on the stripe form ITO films by a plasma CVD method using ethyl silicate (TEOS: Tetra-Ethoxyortho-Silicate) represented by the general formula $Si(OC_2H_5)_4$ and oxygen ($O_2$).

Next, a photoresist was applied to the $SiO_2$ film, the photoresist was formed into a desired shape by lithography, and the substrate was immersed in a mixed liquid comprised of ammonium fluoride, hydrofluoric acid and the like, whereby the $SiO_2$ film in the areas not covered with the photoresist was removed. Thereafter, the photoresist was removed by an organic solvent such as acetone.

Second Electrodes (Counter Poles)

The counter poles were produced by the following procedure. Namely, copper electrodes in a stripe form were formed on a substrate formed of a polycarbonate, or polyethylene terephthalate (PET), or an epoxy resin such as a glass-epoxy resin used for circuit boards, or the like. In forming the stripe form electrodes, first, a film of copper was formed on the entire surface of the substrate by sputtering or the like. Subsequently, a photoresist was applied to the copper electrode formed on the entire surface, the surface of the photoresist was covered with a stripe form metal mask or UV-shielding mask, and irradiation with UV rays was conducted. The photoresist and the electrode in the areas masked by lithography were removed by wet etching or dry etching so that the stripe form electrodes are insulated from each other. Subsequently, the thus formed stripe electrodes were immersed in a solution containing bismuth chloride dissolved therein, and metallic bismuth was deposited on the electrodes by electroplating, to form counter poles.

The copper electrodes were about 15 μm in thickness, the bismuth electrodes were about 15 μm in thickness, and the total electrode thickness was about 30 μm. Incidentally, in order to deposit metallic bismuth, an electroless method for depositing a metal without applying an electric field might also be adopted, but the electroplating method makes it possible to obtain a thicker film of the metal deposited, and, therefore, the electroplating method was adopted here.

Incidentally, while the gaps between the pixels are covered with the solid state electrolyte, it is preferable to use a white substrate in view of that the solid state electrolyte is assumed to be transparent or translucent. In addition, it is desirable that the interval of the pixels for display is as small as possible.

[Preparation and Application of Polymeric Solid State Electrolyte]

One part by weight of polyvinyl alcohol having a molecular weight of about 350 thousands, 10 parts by weight of a 1:1 mixed solvent of water/isopropyl alcohol, 1.7 parts by weight of lithium bromide, and 1.7 parts by weight of bismuth chloride were mixed, and the mixture was heated to 120° C., to prepare a uniform solution. Next, 0.2 part by weight of titanium dioxide having an average particle diameter of 0.5 μm was added to the solution, and was dispersed in the solution by a homogenizer.

The electrolyte solution thus prepared was applied to the above-mentioned substrate in a thickness of 60 μm by use of a doctor blade, then the second electrodes were immediately adhered thereto, and the assembly was subjected to reduced-pressure drying at 110° C. and 0.1 MPa for 1 hr, to form a gelled polymeric solid state electrolyte between the two kinds of electrodes. Subsequently, the end faces of adhesion were sealed with an adhesive.

[Driving and Evaluation of Display Characteristics]

The deposition overvoltage is 0.65 V, and the operating voltage was set to 1.2 V. A desired set of the stripe form electrodes were selected by a known method, and, at the time of coloration, a quantity of electricity of 5 μC per a pixel was passed to the display poles for 0.1 sec, thereby causing a reduction reaction on the display pole side. At the time of decoloration, the same quantity of electricity as above was used, to cause oxidation. Thus, the coloration display and no-color (white) display were changed over. The reflectance at the time of the no-color (white) display was 70%, whereas the optical density (OD) of the display portions at the time of coloration (black) display was about 1.4 (reflectance: 4%). Coloration or decoloration at non-selected pixels did not occur.

After the desired pixels were put into the colored condition, the circuits were opened, and the system was left to stand. After one week, the optical density of the display portions showed no change, which means that the system has a memory property. When a coloration-decoloration cycle was repeated, the number of repeated cycles until the black density upon coloration is reduced to or below 1.0 was found to be about 80 millions.

EXAMPLE 2

Metallic ion: silver

First electrodes were produced in the same manner as in Example 1 above. Second electrodes were obtained by electroplating silver in a silver nitrate solution.

[Preparation and Application of Polymeric Solid State Electrolyte]

One part by weight of polyvinylidene fluoride having a molecular weight of about 350 thousands, 10 parts by weight of dimethyl sulfoxide, 1.7 parts by weight of silver iodide, and 1 part by weight of sodium iodide were mixed, and the mixture was heated to 120° C., to prepare a uniform solution. Subsequently, 0.2 part by weight of titanium dioxide having an average particle diameter of 0.5 μm was added to the solution, and was dispersed uniformly in the solution by a homogenizer. The solution thus obtained was applied to a glass substrate provided thereon with the first electrodes, in a thickness of 20 μm by use of a doctor blade. This assembly was then immediately adhered to a substrate provided thereon with common electrodes, which are the second electrodes, and the resulting assembly was subjected to reduced-pressure drying at 110° C. and 0.1 MPa for 1 hr, to form a gelled polymeric solid state electrolyte between the two kinds of electrodes. Subsequently, the end faces of adhesion were sealed with an adhesive.

[Driving and Evaluation of Display Characteristics]

The deposition overvoltage is 0.7 V, and the driving voltage was set to 1.2 V. Upon the same evaluation as in Example 1, the reflectance at the time of no-color (white) display was found to be 70%, and the optical density (OD) of display portions at the time of coloration (black) display was found to be about 1.4 (reflectance: 4%). Coloration or decoloration at non-selected pixels did not occur. After desired pixels were put into a colored condition, the circuits were opened, and the system was left to stand. After one week, the optical density of the display portions showed no change, which means that the system has a memory property. When a coloration-decoloration cycle was repeated, the number of repeated cycles until the black density upon coloration is reduced to or below 1.0 was found to be about 80.32 millions.

As is clear from the above description, the present invention has a great significance in that simple matrix driving is enabled in a display apparatus utilizing an electrochemical reaction, and a display with high quality free of coloration at unintended pixels (the so-called crosstalk) is achieved even by the simple matrix driving. Therefore, in an electrochemical display apparatus, the apparatus constitution can be simplified, and the price of the apparatus can be lowered.

Besides, the display apparatus according to the present invention performs a display by utilizing the deposition and dissolution reactions of metallic ions due to electrochemical reduction and oxidation, so that it is possible to enhance contrast and black density. In addition, even when the display apparatus is used for a long time, such problems as discoloration (fading) are not generated, and the black density can be maintained at a high level.

The invention claimed is:

1. A display apparatus for performing display by use of electrochemical deposition/dissolution of a metal, wherein said apparatus is driven by a simple matrix driving system, and a deposition overvoltage at the time of deposition of metallic ions as said metal is used as a threshold in said simple matrix driving, wherein a driving voltage is set to be not more than two times said deposition overvoltage.

2. The display apparatus as set forth in claim 1, wherein said metal subjected to deposition/dissolution is at least one selected from the group consisting of bismuth, copper silver, lithium, iron, chromium, nickel, and cadmium.

3. The display apparatus as set forth in claim 1, wherein said apparatus comprises transparent electrodes and counter electrodes, and display is performed through deposition/dissolution of said metal on said transparent electrodes.

4. The display apparatus as set forth in claim 3, wherein the potential difference between said metal to be deposited on said transparent electrodes and said counter electrodes is less than said deposition overvoltage.

5. The display apparatus as set forth in claim 3, wherein a polymeric solid state electrolyte layer is provided between said transparent electrodes and said counter electrodes.

6. The display apparatus as set forth in claim 5, wherein a matrix polymer constituting said polymeric solid state electrolyte layer is at least one solected from polyethylene oxide, polyethyleneiniine, and polyethylene sulfide represented by —(C—C—O)n-, —(C—CN)n-, or —(C—C—S)n-, or polymeric materials having these background chain structure and further having branched chains, or polymethyl methacrylate, polyvinylidene fluoride, polyvinylidene chloride, and polycarbonates.

7. The display apparatus as set forth in claim 5, wherein said polymeric solid state electrolyte layer contains a metallic salt or an alkylammonium salt as an electrolyte salt.

8. The display apparatus as set forth in claim 5, wherein said polymeric solid state electrolyte layer contains at least one selected from the group consisting of water, ethyl alcohol, isopropyl alcohol, propylene carbonate, dimethyl carbonate, ethylene carbonate, .gamma.-butyrolactone, acetonitrile, sulfolane, dimethoxyethane, dimethylformamide, and dimethyl sulfoxide, as a plasticizer.

9. The display apparatus as set forth in claim 5, wherein said polymeric solid state electrolyte layer contains a coloring material.

10. The display apparatus as set forth in claim 9, wherein said coloring material is at least one selected from inorganic pigments, organic pigments, or dyes.

11. The display apparatus as set forth in claim 10, wherein said coloring material is a white inorganic pigment.

12. The display apparatus as set forth in claim 11, wherein said white inorganic pigment is at least one selected from the group consisting of titanium dioxide, calcium carbonate, magnesium oxide, and aluminum oxide.

13. The display apparatus as set forth in claim 9, wherein said polymeric solid state electrolyte layer is comprised of a plurality of layers, and said coloring material is contained in only a part of said layers.

14. The display apparatus as set forth in claim 5, wherein said polymeric solid state electrolyte layer contains a reducing agent or an oxidizing agent for restraining side reactions.

15. The display apparatus as set forth in claim 3, wherein said transparent electrodes comprise $SnO_2$, $In_2O_3$, or a mixture thereof as a main constituent.

16. The display apparatus as set forth in claim 3, wherein said counter electrodes are comprised of a thin metallic film.

17. The display apparatus as set forth in claim 3, wherein said apparatus comprises third electrodes independent from said transparent electrodes and said counter electrodes.

18. The display apparatus as set forth in claim 17, wherein said third electrodes are formed in an electrically insulated condition in the same plane as said transparent electrodes or said counter electrodes.

19. The display apparatus as set forth in claim 18, wherein said third electrodes are potential detecting electrodes.

20. A method of driving a display apparatus for performing display by use of electrochemical deposition/dissolution of a metal by a simple matrix driving system, wherein said simple matrix driving is conducted by using a deposition overvoltage at the time of deposition of metallic ions as said metal as a threshold, wherein a driving voltage is set to be not more than two times said deposition overvoltage.

21. The method of driving a display apparatus as set forth in claim 20, wherein said simple matrix driving is conducted by transparent electrodes and counter electrodes so as to effect deposition/dissolution of said metal on said transparent electrodes, thereby peforming said display.

22. The method of driving a display apparatus as set forth in claim 21, wherein the potential difference between said metal to be deposited on said transparent electrodes and said counter electrodes is set to be less than said deposition overvoltage.

* * * * *